(12) United States Patent
Beh et al.

(10) Patent No.: US 11,872,528 B2
(45) Date of Patent: Jan. 16, 2024

(54) SYSTEM AND METHOD FOR SEPARATING SOLVENT FROM A FLUID

(71) Applicant: Palo Alto Research Center Incorporated, Palo Alto, CA (US)

(72) Inventors: Eugene S. Beh, Portola Valley, CA (US); Michael Benedict, Palo Alto, CA (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 17/522,076

(22) Filed: Nov. 9, 2021

(65) Prior Publication Data
US 2023/0144024 A1   May 11, 2023

(51) Int. Cl.
| | |
|---|---|
| *B01D 61/58* | (2006.01) |
| *B01D 61/42* | (2006.01) |
| *C02F 1/469* | (2023.01) |
| *B01D 61/00* | (2006.01) |

(Continued)

(52) U.S. Cl.
CPC .......... *B01D 61/58* (2013.01); *B01D 61/002* (2013.01); *B01D 61/427* (2013.01); *C02F 1/445* (2013.01); *C02F 1/4698* (2013.01); *B01D 2317/022* (2013.01); *B01D 2317/04* (2013.01); *C02F 2101/34* (2013.01)

(58) Field of Classification Search
CPC .... B01D 61/58; B01D 61/002; B01D 61/427; B01D 2317/022; B01D 2317/04; C02F 1/445; C02F 1/4698; C02F 2101/34
See application file for complete search history.

(56) References Cited

U.S. PATENT DOCUMENTS

| | | |
|---|---|---|
| 2,672,024 A | 3/1954 | McGrath |
| 4,118,299 A | 10/1978 | Maget |
| 4,593,534 A | 6/1986 | Bloomfield |

(Continued)

FOREIGN PATENT DOCUMENTS

| | | |
|---|---|---|
| CN | 206055832 | 3/2017 |
| CN | 108187459 | 6/2018 |

(Continued)

OTHER PUBLICATIONS

"Lazard's Levelized Cost of Storage—Version 2.0." 2016, 46 pages.

(Continued)

*Primary Examiner* — Pranav N Patel
(74) *Attorney, Agent, or Firm* — Mueting Raasch Group

(57) ABSTRACT

An electrochemical system has a first reservoir receiving a feed stream. The feed stream includes a solvent and a solute different than the salt. A second reservoir receives a brine stream with a higher salt concentration higher than the feed stream. Electrodes contact a loop of redox-active electrolyte material causing reversible redox reactions. The reactions cause the loop to accept a first ion from the salt in the first reservoir and drive a second ion into the brine stream in the second reservoir. Three ionic exchange membranes of alternating type define the first and second reservoirs. A concentrate stream is output from the first reservoir, the concentrate stream having a second solute concentration greater than the first solute concentration.

14 Claims, 5 Drawing Sheets

(51) Int. Cl.
   *C02F 1/44*      (2023.01)
   *C02F 101/34*    (2006.01)

(56) References Cited

U.S. PATENT DOCUMENTS

| | | | |
|---|---|---|---|
| 4,984,434 | A | 1/1991 | Peterson et al. |
| 6,159,352 | A | 12/2000 | Riera et al. |
| 6,187,201 | B1 | 2/2001 | Abe et al. |
| 6,719,891 | B2 | 4/2004 | Ruhr et al. |
| 7,083,730 | B2 | 8/2006 | Davis |
| 7,974,076 | B2 | 7/2011 | Xiong et al. |
| 7,992,855 | B2 | 8/2011 | Awano |
| 8,142,633 | B2 | 3/2012 | Batchelder et al. |
| 8,545,692 | B2 | 10/2013 | James et al. |
| 8,769,972 | B2 | 7/2014 | Bahar |
| 8,801,910 | B2 | 8/2014 | Bazant et al. |
| 8,999,132 | B2 | 4/2015 | Bazant et al. |
| 9,112,217 | B2 | 8/2015 | Kim et al. |
| 9,340,436 | B2 | 5/2016 | Sahu et al. |
| 9,546,426 | B2 | 1/2017 | Logan et al. |
| 9,548,620 | B2 | 1/2017 | Hu et al. |
| 9,640,826 | B2 | 5/2017 | Yan et al. |
| 9,670,077 | B2 | 6/2017 | Volkel et al. |
| 9,673,472 | B2 | 6/2017 | Volkel et al. |
| 9,905,876 | B2 | 2/2018 | Schubert et al. |
| 10,124,296 | B2 | 11/2018 | Pozzo et al. |
| 10,374,239 | B2 | 8/2019 | Zhang et al. |
| 10,525,417 | B2 | 1/2020 | Newbloom et al. |
| 10,550,014 | B2 | 2/2020 | Desai et al. |
| 10,821,395 | B2 | 11/2020 | Beh et al. |
| 10,822,254 | B2 | 11/2020 | Desai et al. |
| 11,015,875 | B2 | 5/2021 | Benedict et al. |
| 11,020,713 | B2 | 6/2021 | Demeter et al. |
| 11,117,090 | B2 | 9/2021 | Benedict et al. |
| 11,149,970 | B2 | 10/2021 | Bahar et al. |
| 2005/0183956 | A1 | 8/2005 | Katefidis |
| 2006/0141346 | A1 | 6/2006 | Gordon et al. |
| 2015/0048777 | A1 | 2/2015 | Goldstein |
| 2015/0232348 | A1 | 8/2015 | Jepson |
| 2019/0046927 | A1 | 2/2019 | Bhikhi et al. |
| 2019/0240614 | A1 | 8/2019 | Beh et al. |
| 2019/0240623 | A1 | 8/2019 | Beh et al. |
| 2020/0070094 | A1 | 3/2020 | Hussaini et al. |
| 2020/0164312 | A1 | 5/2020 | Beh et al. |
| 2020/0333086 | A1* | 10/2020 | Benedict ............... F24V 30/00 |
| 2021/0276892 | A1 | 9/2021 | McDonald et al. |
| 2021/0370228 | A1 | 12/2021 | Benedict et al. |

FOREIGN PATENT DOCUMENTS

| | | |
|---|---|---|
| EP | 3336064 | 6/2018 |
| JP | 04-18919 | 4/1992 |
| KR | 20130106530 | 9/2013 |
| KR | 20150034545 | 4/2015 |
| WO | 2014/181898 | 11/2014 |
| WO | 20150143332 | 9/2015 |
| WO | 2018/032003 | 2/2018 |
| WO | 2018/119280 | 6/2018 |
| WO | 20180191806 | 10/2018 |

OTHER PUBLICATIONS

Al-Jubainawi et al., "Factors governing mass transfer during membrane electrodialysis regeneration of LiCl solution for liquid desiccant dehumidification systems", Sustainable Cities and Society, vol. 28, Aug. 26, 2016.
Al-Karaghouli et al., "Energy consumption and water production cost of conventional and renewable-energy-powered desalination processes", Renewable and Sustainable Energy Reviews 2013, 24, 343-356.
Anderson et al., Capacitive deionization as an electrochemical means of saving energy and delivering clean water. Comparison to present desalination practices: Will it compete?:, Electrochimica Acta 2010, 55 (12), 3845-3856.
Arellano et al., "Effects of pH on the degradation of aqueous ferricyanide by photolysis and photocatalysis under solar radiation", Solar Energy Materials and Solar Cells 2010, 94 (2), 327-332.
Ashrae Standard, "Method of Testing for Rating Desiccant Dehumidifiers Utilizing Heat for the Regeneration Process", 2007.
Bajpayee et al., "Very low temperature membrane-free desalination by directional solvent extraction", Energy Environ. Sci. 2011, 4 (5), 1672.
Beh et al., "A Neutral pH Aqueous Organic-Organometallic Redox Flow Battery with Extremely High Capacity Retention" ACS Energy Lett, 2017, 2, pp. 639-644.
Beh et al., U.S. Appl. No. 17/149,184, filed Jan. 14, 2021.
Beh et al., U.S. Appl. No. 17/214,404, filed Mar. 26, 2021.
Beh, U.S. Appl. No. 17/357,155, filed Jun. 24, 2021.
Benedict et al., U.S. Appl. No. 17/161,904, filed Jan. 29, 2021.
Benedict et al., U.S. Appl. No. 17/204,703, filed Mar. 17, 2021.
Benedict et al., U.S. Appl. No. 17/400,774, filed Aug. 12, 2021.
BTMAP-VI et al., "Ordering and Customer Service Neutral pH Aqueous Redox Flow Battery Materials", Jan. 1, 2017, pp. 639.
Cheng et al., "Double-Stage Photovoltaic/Thermal ED Regeneration for Liquid Desiccant Cooling System", Energy and Buildings, 51, 2012, pp. 64-72.
Dai, "Increasing drought under global warming in observations and models", Nat. Clim.Change 2013, 3 (1), 52-58.
Darling et al., "Pathways to low-cost electrochemical energy storage: a comparison of aqueous and nonaqueous flow batteries", Energy Environ. Sci. 2014, 7 (11), 3459-3477.
Desai et al., "Electrochemical Desalination of Seawater and Hypersaline Brines with Coupled Electricity Storage", ACS Energy Lett. 3, 2, 2018, pp. 375-379.
Desalination Experts Group, "Desalination in the GCC", 2014, 47 pages.
Dipaola, "Saudi Arabia Gets Cheapest Bids for Solar Power in Auction" Bloomberg, Jan. 16, 2018, 3 pages.
Ferguson et al., "Studies On Overvoltage. IX: The Nature of Cathode and Anode Discharge Potentials at Several Metal Surfaces1,2", J. Phys. Chem. 1937, 42 (2), 171-190. (no copy available).
Gong et al., "A zinc-iron redox-flow battery under $100 per kW h of system capital cost", Energy & Environmental Science, 2015. 5 pages.
Gong et al., All-Soluble All-Iron Aqueous Redox-Flow Battery, ACS Energy Letters, 2016, 1, pp. 89-93.
Gowin, "Examining the economics of seawater desalination using the DEEP code", Nuclear Power Technology Development Section, I. A. E. A., Ed. Vienna, Austria, 2000.
Gu et al., "A multiple ion-exchange membrane design for redox flow batteries", Energy Environ. Sci. 2014, 7 (9), 2986.
Hilbert et al., "Correlations between the Kinetics of Electrolytic Dissolution and Deposition of Iron: I . The Anodic Dissolution of Iron", Journal of The Electrochemical Society 1971, 118 (12), 1919-1926.
Howell et al., "Overview of the DOE VTO Advanced Battery R&D Program", Jun. 6, 2016 24 pages.
Hu et al, "Long-Cycling Aqueous Organic Redox Flow Battery (AORFB) toward Sustainable and Safe Energy Storage", Journal of the American Chemical Society 2017, 139 (3), 1207-1214.
John et al., "Seasonal cycles of temperature, salinity and water masses of the western Arabian gulf", Oceanol. Acta 1990, 13 (3), 273-281.
Khawaji et al., "Advances in seawater desalination technologies", Desalination 2008, 221 (1-3), 47-69.
Konopka et al., "Diffusion coefficients of ferri- and ferrocyanide ions in aqueous media, using twin-electrode thin-layer electrochemistry", Anal. Chem. 1970, 42 (14), 1741-1746. (no copy available).
Kozubal et al., "Low-Flow Liquid Desiccant Air-Conditioning: Demonstrated Performance and Cost Implications" NREL Technical Report, Sep. 2014, 104 pages.
La Mantia et al., "Batteries for efficient energy extraction from a water salinity difference", Nano Lett. 2011, 11 (4), 1810-3.
Lee et al., "Desalination of a thermal power plant wastewater by membrane capacitive deionization", Desalination 196, 2006, pp. 125-134.

(56) References Cited

OTHER PUBLICATIONS

Lee et al., "Rocking chair desalination battery based on Prussian blue electrodes", ACS Omega 2017, 2 (4), 1653-1659.
Li et al., "Photovoltaic-electrodialysis regeneration method for liquid desiccant cooling system", Solar Energy, vol. 83, 2009, pp. 2195-2204.
Logan et al., "Membrane-based processes for sustainable power generation using water", Nature 2012, 488, 313.
Loutatidou, et al., "Capital cost estimation of RO plants: GCC countries versus southern Europe", Desalination 2014, 347, 103-111.
Malhotra et al., "Use cases for stationary battery technologies: A review of the literature and existing projects", Renewable and Sustainable Energy Reviews 56, 2016, pp. 705-721.
McGovern et al., "On the cost of electrodialysis for the desalination of high salinity feeds", Applied Energy 136, Dec. 2014, pp. 649-661.
Moore et al., "Evaporation from Brine Solutions Under Controlled Laboratory Conditions; Report 77 for the Texas Water Development Board", May 1968, 77 pages.
Nair et al., "Water desalination and challenges: The Middle East perspective: a review", Desalin. Water Treat. 2013, 51 (10-12), 2030-2040.
Oren, "Capacitive deionization (CDI) for desalination and water treatment—past, present and future (a review)", Desalination 2008, 228 (1-3), 10-29.
Pasta et al., "A desalination battery" Nano Lett.2012, 12 (2), 839-43.
Patil et al., "Diffusivity of some zinc and cobalt salts in water", J. Chem. Eng. Data 1993, 38 (4), 574-576.
Sadrzadeh et al., "Sea water desalination using electrodialysis", Desalination 2008, 221 (1), 440-447.
Sata, "Application of Ion Exchange Membranes. In Ion Exchange Membranes: Preparation, Characterization, Modification and Application", The Royal Society of Chemistry: Cambridge, 2004.
Schaetzle et al., "Salinity Gradient Energy: Current State and New Trends", Engineering, vol. 1, Issue 2, Jun. 2016, pp. 164-166.
Scialdone et al., "Investigation of electrode material—redox couple systems for reverse electrodialysis processes—Part II: Experiments in a stack with 10-50 ce", Journal of Electroanalystical Chemistry, vol. 704, Jun. 14, 2013, pp. 1-9.
European Patent Application No. 22202902.7; Office Action dated Mar. 13, 2023.
Zou et al., "Electrodialysis recovery of reverse-fluxed fertilizer draw solute during forward osmosis water treatment," Jul. 31, 2017, *Chemical Engineering Journal*, 330: 550-58.
Scialdone et al., "Investigation of electrode material—Redox couple systems for reverse electrodialysis processes. Part I: Iron redox couples", Journal of Electroanalytical Chemistry 2012, 681 (Supplement C), 66-75.
Seto et al., "Seawater desalination by electrodialysis", Desalination 1978, 25 (1), 1-7.
Solveichik, "Flow batteries: current status and trends", Chem. Rev. 2015, 115 (20), 11533-58. (no copy available).
Stillwell et al., "Predicting the specific energy consumption of reverse osmosis desalination", Water 2016, 8 (12).
Torres et al., U.S. Appl. No. 63/127,604, filed Dec. 18, 2020.
Urban, "Emerging Scientific and Engineering Opportunities within the Water-Energy Nexus", Joule, Dec. 20, 2017, pp. 665-688.
US Dept. of Energy, "Desiccant Enhanced Evaporative Air-Conditioning (DEVap): Evaluation of a New Concept in Ultra Efficient Air Conditioning", Technical Report NREL/TP-5500-49722, 2011.
US Dept. of Energy, "Energy Savings Potential and RD&D Opportunities for Commercial Building HVAC Systems", Dec. 2017, 172 pages.
US Dept. of Interior/US Geological Survey, Estimated Use of Water in the United States in 2010, 2014, 64 pages.
Vermaas et al., "High Efficiency in Energy Generation from Salinity Gradients with Reverse Electrodialysis", ACS Sustainable Chem. Eng. 1, 2013, pp. 1295-1302.
Viswanathan et al., "Cost and performance model for redox flow batteries", Journal of Power Sources, vol. 247, Dec. 23, 2012, pp. 1040-1051.
Wang et al., "Continuous desalination with a metal-free redox-mediator", Journal of Materials Chemistry A, No. 7, 2019, 7 pages.
Woods, "Membrane processes for heating, ventilation, and air conditioning", Renewable and Sustainable Energy Reviews, vol. 33, 2014, pp. 290-304.
Wu et al., "Kinetic study on regeneration of Fe(II)EDTA in the wet process of NO removal", Chemical Engineering Journal 2008, 140 (1), 130-135.
Ye et al., "Performance of a mixing entropy battery alternately flushed with wastewater effluent and seawater for recovery of salinity gradient energy", Energy Environ. Sci. 2014, 7 (7), 2295-2300.
Zhang et al., "A Natural Driven Membrane Process for Brackish and Wastewater Treatment: Photovoltaic Powered ED and FO Hybrid System", Environmental Science and Technology, Sep. 4, 2013, pp. 10548-10555.
Petrova et al., "Perfluorinated hybrid membranes modified by metal decorated clay nanotubes", Journal of Membrane Science, vol. 582, Jul. 15, 2019, pp. 172-181.
Pismenskaya et al., "Can the electrochemical performance of heterogeneous ion-exchange membranes be better than that of homogeneous membranes?", Journal of Membrane Science, vol. 566, Nov. 15, 2018, pp. 54-68.
Shah et al., "Comparative Studies on Performance of Interpolymer and Heterogeneous Ion-Exchange Membranes for Water Desalination by Electrodialysis", Desalination 172, 2005, pp. 257-265.
Epsztein et al., "Activation behavior for ion permeation in ion-exchange membranes: Role of ion dehydration in selective transport", Journal of Membrane Science 580, 2019, pp. 316-326.
Kaibara et al., Study of Ion Transport across Amphoteric Ion Exchange Membrane. II. Transport of Symmetric Tetraalkylammonium Chlorides?,, Bull. Chem. Sco. Jpn, 56, 1983, pp. 1346-1350.

* cited by examiner

SYSTEM AND METHOD FOR SEPARATING SOLVENT FROM A FLUID

TECHNICAL FIELD

This disclosure relates generally to systems and methods for removing a solvent, such as water, from a fluid using a redox flow electrochemical separation device.

BACKGROUND

Some industries utilize processes that remove solvents (e.g., water, alcohol) from a solution. For example, the food and beverage industry may wish to remove water to create a food product that is concentrated and easier to ship, such as juice concentration, creating of powdered beverages, whey processing, etc. In these examples, the concentrated stream is of value to the producer. Waste processing plants may also wish to extract clean water from a waste stream. In this case, the solvent itself is of value to the processor, where the concentrate is not.

Solvent removal can be currently done in a number of ways, such as by evaporating the solvent (thermal), by filtering out only the solvent under high pressure (reverse osmosis), or by extracting the solvent, across a membrane, into a draw solution of higher osmotic potential (forward osmosis). Using thermal energy can sometimes affect the end product (e.g., heat can alter the taste of foods) and also uses significant amounts of energy. Forward and reverse osmosis does not necessarily heat the stream, but can be more expensive to implement.

SUMMARY

Embodiments described herein are directed to an electrodialysis apparatus. In one embodiment, an electrochemical system includes a first reservoir receiving a feed stream. The feed stream includes a solvent, a salt having a first salt concentration in the feed stream, and a solute different than the salt at a first solute concentration. A second reservoir receives a brine stream, the brine stream having a second salt concentration higher than the first salt concentration. A first electrode contacts a first solution of a first redox-active electrolyte material and is configured to have a first reversible redox reaction with the first redox-active electrolyte material, and accept a first ion from the salt in the first reservoir. A second electrode contacts a second solution of a second redox-active electrolyte material and is configured to have a second reversible redox reaction with the second redox-active electrolyte material, and drive a second ion into the brine stream in the second reservoir. An energy source is configured to supply electrical potential to the first and second electrodes. A first membrane having a first ion exchange type is disposed between the first and second reservoirs. A second membrane having a second ion exchange type, different from the first ion exchange type, is disposed between the first electrode and the first reservoir. A third membrane having the second ion exchange type is disposed between the second electrode and the second reservoir. An effluent stream comprising the solvent and a third salt concentration is output from the second reservoir. The solvent is removed from the first reservoir via electroosmosis and forward osmosis. A concentrate stream is output from the first reservoir. The concentrate stream has a fourth salt concentration that is less than the first, second, and third salt concentrations, and a second solute concentration greater than the first solute concentration.

Other embodiments are directed to a method that involves inputting a feed stream comprising a first salt concentration to a first reservoir defined by a first ion exchange membrane and a second ion exchange membrane of an electrochemical cell. The second ion exchange membrane is a different type of membrane from the first ion exchange membrane. The feed stream has a solute different than the salt at a first solute concentration. The method further involves inputting a second fluid stream comprising a second salt concentration that is higher than the first salt concentration to a second reservoir of the electrochemical cell. The second reservoir is defined by the first ion exchange membrane and a third ion exchange membrane. The third ion exchange membrane and the second ion exchange membrane are of a same type. An external voltage is applied to first and second electrodes of the electrochemical cell. A solution having a redox-active electrolyte material is circulated between the first and second electrodes. The redox-active electrolyte material reduces when in contact with the first electrode and oxidizes when in contact with the second electrode. In response to reduction and oxidation of the redox-active electrolyte material, ions are transported across the first, second, and third ion exchange membranes to remove solvent and salt from the first reservoir via electroosmosis and forward osmosis. An effluent stream is output from the second reservoir, and has a third salt concentration different from the second salt concentration. A concentrate stream is output from the first reservoir. The concentrate stream comprises a fourth salt concentration that is less than the first and third salt concentrations, and a second solute concentration greater than the first solute concentration.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below refers to the following figures, wherein the same reference number may be used to identify the similar/same component in multiple figures. However, the use of a number to refer to a component in a given figure is not intended to limit the component in another figure labeled with the same number. The figures are not necessarily to scale.

DETAILED DESCRIPTION

Figure 1:
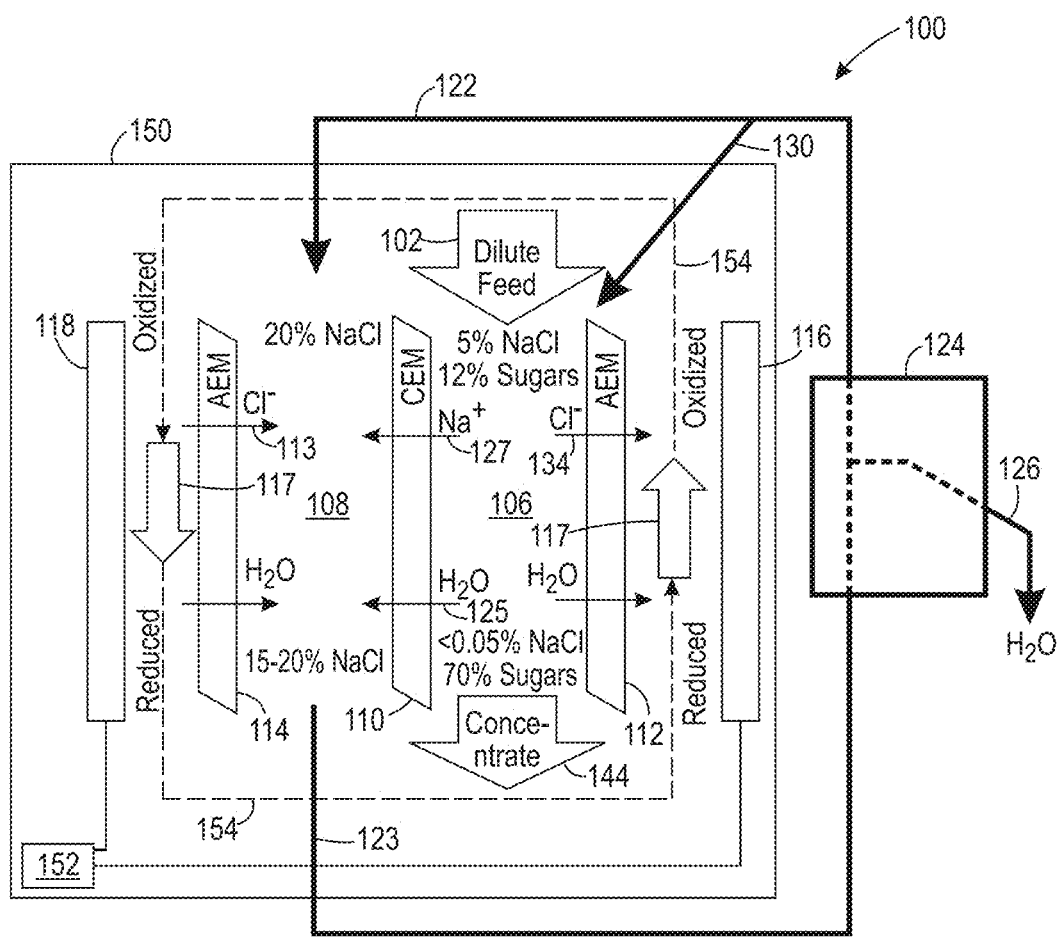
FIG. 1 is a diagram of a redox flow electrochemical solvent removal stack and system according to an example embodiment.

Systems and methods are described for removing water from a feed stream using a combination of forward osmosis and electroosmosis, by electrochemically removing solutes (e.g., salt) from the feed stream. The feed stream can be optionally enriched in solutes, either the same as, different from, or some combination of the pre-existing solutes in the feed stream, prior to its introduction into the electrochemical salt removal system. In FIG. 1, a diagram shows an electrochemical liquid regenerator 100 illustrating fluid and ion movement in accordance with various embodiments. An electrochemical device 150 includes two electrodes 116, 118, at least three ion exchange membranes 110, 112, 114, an energy supply 152, a reaction mixture, and a receiving fluid.

The first electrode 116 contacts a first solution of a first redox-active electrolyte material and configured to have a first reversible redox reaction with the first redox-active electrolyte material. The second electrode 118 contacts a second solution of a second redox-active electrolyte material and configured to have a second reversible redox reaction with the second redox-active electrolyte material. For purposes of simplicity, the first and second redox-active electrolyte materials are shown in the FIG. 1 as a redox shuttle solution 117 comprising a redox-active electrolyte material.

Examples of a redox shuttle solution include 1,1'-bis((3-trimethylammonio)propyl)ferrocene ([BTMAP-Fc]$^{2+}$) and 1,1'-bis((3-trimethylammonio)propyl)ferrocenium ([BTMAP-Fc]$^{3+}$), or 1,1'-bis((3-dimethylethylammonio)propyl)ferrocene ([BDMEAP-Fc]$^{2+}$) and 1,1'-bis((3-dimethylethylammonio)propyl)ferrocenium ([BDMEAP-Fc]$^{3+}$), which are non-toxic, highly stable, have very rapid electrochemical kinetics and negligible membrane permeability, or ferrocyanide/ferricyanide ([Fe(CN)$_6$]$^{4-}$/[Fe(CN)$_6$]$^{3-}$). Additional details for example redox shuttle solutions can be found in commonly-owned U.S. patent application Ser. No. 17/390,600, filed Jul. 30, 2021, which is hereby incorporated by reference in its entirety.

The redox shuttle 117 is circulated between the two electrodes 116, 118 as shown by loop 154. When an electrical potential is applied to each electrode 116, 118 by energy supply 152, the redox shuttle is oxidized at a first electrode (e.g., 116) and reduced at the opposite electrode (e.g., 118). The energy supply 152 may be any variety of direct current (DC) energy supply such as a battery, photovoltaic panel, galvanic cell, potentiostat, AC/DC power converter, etc., the polarity may be kept the same throughout or periodically reversed, and the energy supply may be contained within the electrochemical device 150 or be external and coupled to the device 150. Thus, as the shuttle 117 circulates between the electrodes, the portions of the shuttle 117 are continuously alternating between the redox states. In certain embodiments, each electrode 116, 118 may contact separate redox-active solutions instead of the same redox shuttle solution 117 being flowed in a loop. The separate redox-active solutions may have the same redox-active electrolyte material or different redox-active electrolyte materials. When different redox-active solutions are used for the respective electrodes 116, 118, the energy supply may periodically reverse the potential supplied to the electrodes to restore the state of charge (i.e., the proportion of redox-active electrolyte material in each solution that is in the oxidized state compared to the reduced state) of each of the redox-active electrolyte material solutions.

Positioned between the electrodes 116, 118 are three, or more, ion exchange membranes, which alternate in the type of ion exchanged. For example, among three membranes, a center membrane 110 may be a cation exchange membrane flanked by second 112 and third 114 anion exchange membranes, as is shown in FIG. 1. However, in other embodiments, the center, first membrane may be an anion exchange membrane and the second and third membranes may be cation exchange membranes. The membranes 110, 112, 114 define channels, or reservoirs, in the electrochemical device 150. As may be seen, a first membrane 110 and a second membrane 112 define a first reservoir 106, which in this example is configured as a desalinate chamber. The first membrane 110, in combination with a third membrane 114, also defines a second reservoir 108, which in this example is configured as a salinate (or concentrate) channel. The membranes 110, 112, 114 are ion-selective as well as water-permeable, are insoluble in organic solvents, and are inert (e.g., do not chemically change) in the reaction mixture and/or products. In certain embodiments, the membranes are as thin as possible (e.g., 10-50 μm) to maximize the rate of forward osmosis water transport through the membranes. In certain embodiments, the membranes are reinforced with a polymer mesh integrated into the membrane itself and in other embodiments, the membranes are not reinforced.

A feed stream 102 is input to the first reservoir 106 of the electrochemical device 150. The feed stream 102 includes at least a solvent (water in this example) and a salt (NaCl in this example, but also Na$_2$SO$_4$, CaCl$_2$, KCl, and any other ionic salt in the chemistry definition of "a salt") having a first salt concentration (about 5% by weight in this example). The feed stream 102 also includes a solute at a first solute concentration, the solute being different from the salt. In this example, the solute is sugar at about 12% concentration, and could be any type of sugar or combinations thereof (e.g., sucrose, fructose, dextrose, etc.). Other solutes may include food solutes or particles, waste matter, buffers, amino acids, salts different than the salts used in the brine stream 122, a catalyst used to encourage a chemical reaction within the feed stream, glycerol, ethylene glycol, etc. A brine stream 122 is input into the second reservoir 108 of the electrochemical device 150. The brine stream has a second salt concentration (about 20%) higher than the first concentration A portion 130 of the concentrated brine is optionally mixed with the feed stream 102 as the feed stream 102 enters the first reservoir 106 of the electrochemical device 150.

When an electrical potential is applied to the electrodes 116, 118, the redox shuttle 117 is oxidized at one electrode 116 and reduced at the other electrode 118, thereby driving salt ions 127 from the feed stream 102 in the first reservoir 106 into the brine stream 122 in the second reservoir 108. In particular, the redox shuttle 117 at the first electrode 116 accepts at least one ion 134 from the salt in the first reservoir 106. The redox shuttle 117 at the second electrode 118 drives at least one ion 133 into the brine stream 122 in the second reservoir 108, and the charge is balanced by driving at least one ion 127, of opposite sign of charge to ions 133, 134, from the feed stream 102 in the first reservoir 106 across the center membrane 110 into the brine stream 122 in the second reservoir 108.

The ions 127 that move from the first to second reservoirs 106, 108 will also drag solvent molecules (e.g., water 125) with them across the center membrane 110 in a phenomenon known as electroosmosis. The water 125 also leaves the first reservoir 106 and enters the second reservoir 108 through forward osmosis because the brine solution 122 in the second reservoir 108 has a higher osmotic pressure than the feed stream 102 and therefore also behaves as a draw solution. As a result, an effluent stream 123, which includes the water 125 and a third salt concentration is output from the second reservoir 108. In this case, the concentration of the effluent stream 123 may be the same as or less than that of the input brine stream 122, e.g., 15-20% for the former versus 20% for the latter. Depending on the ratio of salt and water transferred, this stream may or may not be diluted in concentration, but it will have more volume (or flow rate exiting). Note that the term "effluent" used here and elsewhere is used for purposes of illustration and not limitation. In some cases, the streams described as effluent may be reused, retained, reprocessed, etc., and may have some value of their own as part of the overall fluid processing system. In other cases, the effluent streams may be discarded as a waste product.

The processing of the feed stream 102 through the first reservoir 106 results in concentrate stream 144 exiting the first reservoir 106. The concentrate stream 144 includes a fourth salt concentration (e.g., less than 0.05%) that is less than the first, second, and third salt concentrations, from the first reservoir. The concentrate stream 144 also has a higher concentration of solutes than the feed stream 102, e.g., 70% for the former and 12% for the latter. The net result is a transport of water from the feed stream 102 into the brine solution 122. The effluent stream 123 is regenerated (restored to its original concentration and volume) using one or more of a number of possible methods, as indicated by device 124, also referred to herein as a liquid concentrator. The effluent stream 123 can be regenerated thermally at device 124 by evaporating the absorbed water, by reverse osmosis, or electrochemically using electrodialysis or even another electrochemical device using a redox shuttle. The output of device 124 is a discharge stream 126 comprising primarily water or the chief solvent in the feed stream 102.

Figure 2:
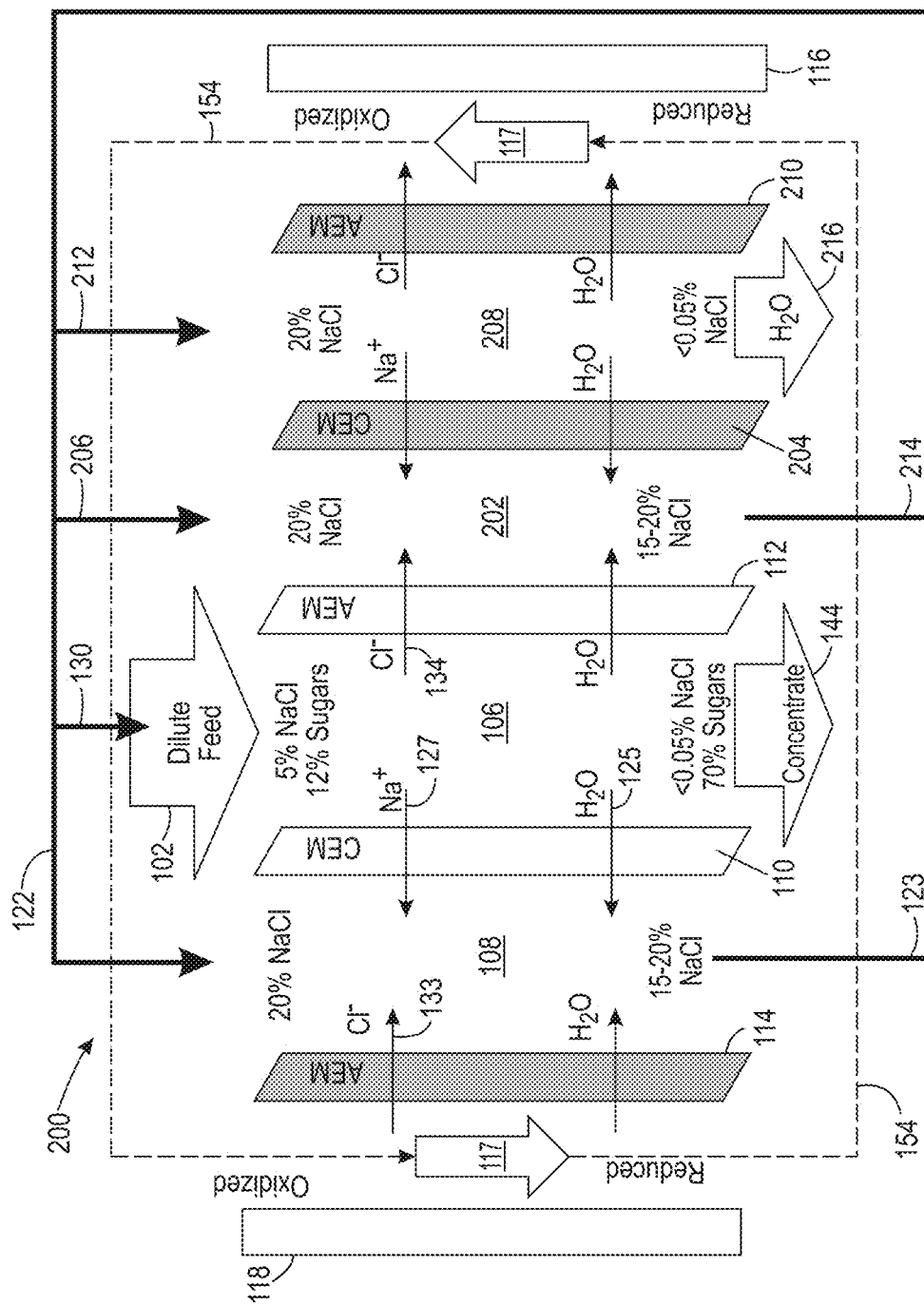
FIG. 2 is a diagram of a redox flow electrochemical solvent removal stack and system according to another example embodiment.

The effluent stream 123 may also be regenerated in the same electrochemical stack (or series of identical stacks) as where the solvent is removed from the feed stream. In FIG. 2, a diagram shows a redox assisted solvent removal stack 200 that includes brine regeneration features according to another example embodiment. The device 200 includes a first reservoir 106, a feed stream 102, a second reservoir 108, a brine stream 122, a first electrode 116, a second electrode 118, redox-active electrolyte material shuttle 117, first reservoir 106, second reservoir 108, first membrane 110, second membrane 112, third membrane 114, effluent stream 123, and concentrate stream 144 similar to what is shown and described in FIG. 1. The stack 200 will also include other components that are not shown for clarity, such as energy supply 152.

In this example, the first and second membranes 110, 112 have a first set of electroosmotic and osmotic transport properties. The third membrane 114 has a second set of electroosmotic and osmotic transport properties that are different from the first set of properties. The system 200 further includes a third reservoir 202 defined by the second membrane 112 and a fourth membrane 204 having the first ion exchange type (the same type as the first membrane 110, CEM in this example). The fourth membrane 204 also has the second set of electroosmotic and osmotic transport properties. A second portion 206 of the brine stream 122 is input to the third reservoir 202.

A fourth reservoir 208 is defined by the fourth membrane 204 and a fifth membrane 210 having the second ion exchange type (AEM in this example) and the second set of electroosmotic and osmotic transport properties. A third portion 212 of the brine solution 122 is input to the fourth reservoir 208. A second effluent stream 214 that includes the solvent and a fifth salt concentration is output from the third reservoir 202. The solvent is moved from the first and fourth reservoirs 106, 208 to the third reservoir 202 via electroosmosis and forward osmosis. A solvent stream 216 with a sixth salt concentration is output from the fourth reservoir 208.

The stack 200 enables a brine regeneration by adding a pair of opposite type (anion vs. cation or cation vs. anion) ion exchange membranes 114, 204 on opposite sides of the membrane pair 110, 112 that bounds the feed stream 102. The outer pair of ion exchange membranes 114, 204 are chosen to have a second, different set of electroosmotic and osmotic transport properties than the inner pair of ion exchange membranes 110, 112. The fifth membrane 210 also has these second electroosmotic and osmotic transport properties and is included to obtain the desired ion exchanges with the redox shuttle 117 at first electrode 116. The feed stream 102 is flowed into the reservoir/chamber 106 bounded by the inner pair of ion exchange membranes 110, 112, and the brine solution 122 is flowed into the remaining reservoirs/chambers 108, 202, 208. The membranes are arranged such that the reservoir/chamber 208 that is bounded by two membranes with low electroosmotic and osmotic transport properties forms another desalination chamber. The portion of brine solution 212 that enters this chamber is thereby desalinated with a minimum of water loss to form a solvent stream 216 (water stream) which exits the electrochemical stack 200. The net result is a single stack that accepts a dilute feed stream and outputs two streams: a concentrated product stream 144, and water/solvent stream 216 having a very low salt content (e.g., less than 0.05% for both).

Figure 3:
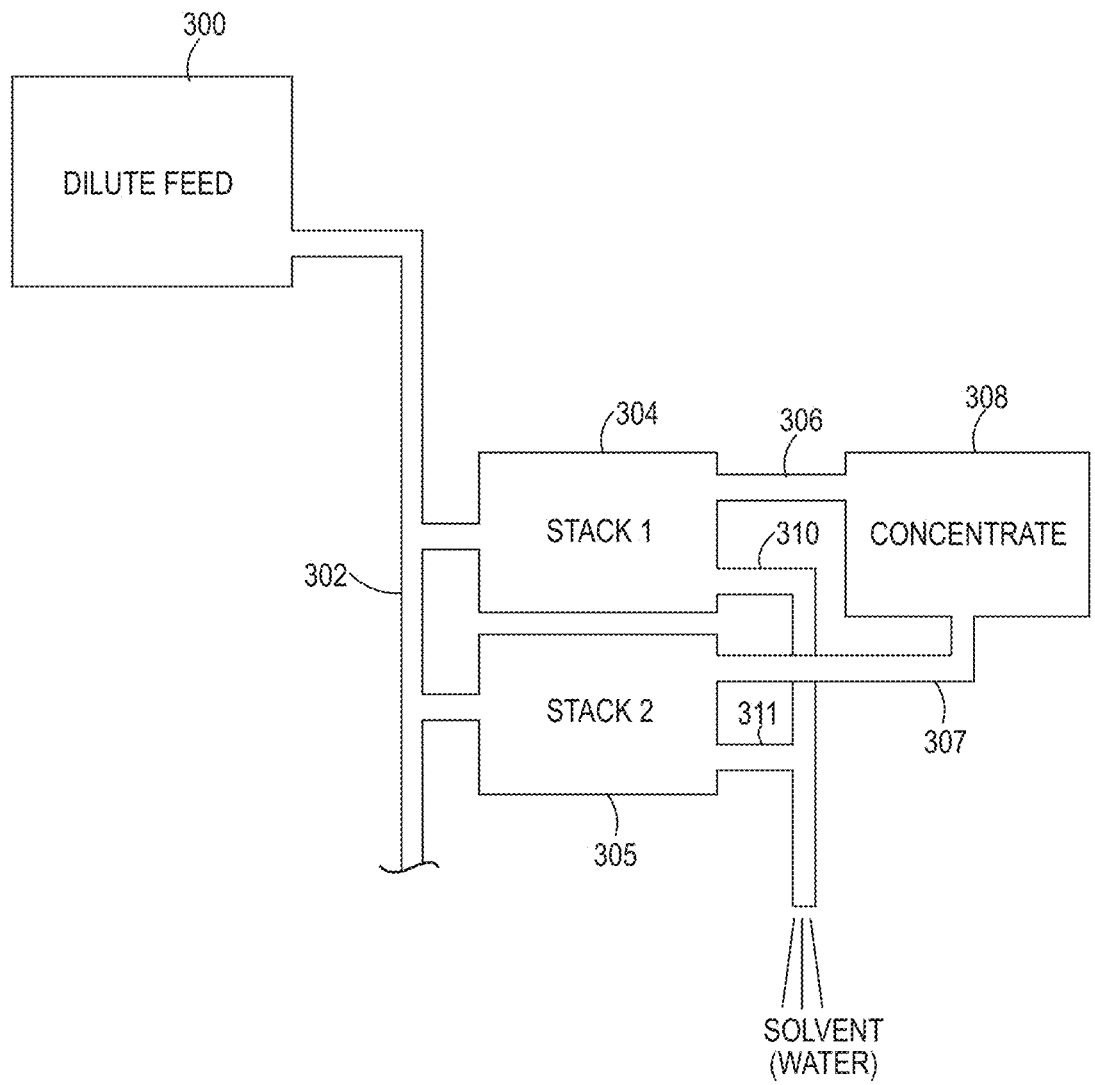
FIGS. 3 and 4 are diagrams showing connection of multiple solvent removal stacks into a processing system according to an example embodiment.

The electrochemical stacks described above can be combined in various ways depending on the scale of processing and/or the amount of solvent removal desired. In FIG. 3, a diagram shows a parallel stack arrangement according to an example embodiment. A dilute feed reservoir 300 is coupled to a manifold 302 or other fluid distribution pathway where it is fed into two or more electrochemical stacks 304, 305. If the stacks 304, 305 are configured as shown in FIG. 1, they may each have their own dedicated salt regeneration device (see device 124) or may share a single (commonly connected) salt regeneration device. Concentrate streams 306, 307 of the stacks 304, 305 are sent into a concentrate reservoir 308 for use or downstream processing, or may be discharged, e.g., as a waste stream. Solvent streams 310, 311 are discharged, however may also be held in a reservoir, holding tank, etc., for use or downstream processing. The system shown in FIG. 3 may utilize other inputs, including electricity to drive the electrochemical reactions in the stacks 304, 305 and to drive fluid pumps (not shown) as known in the art.

Figure 4:
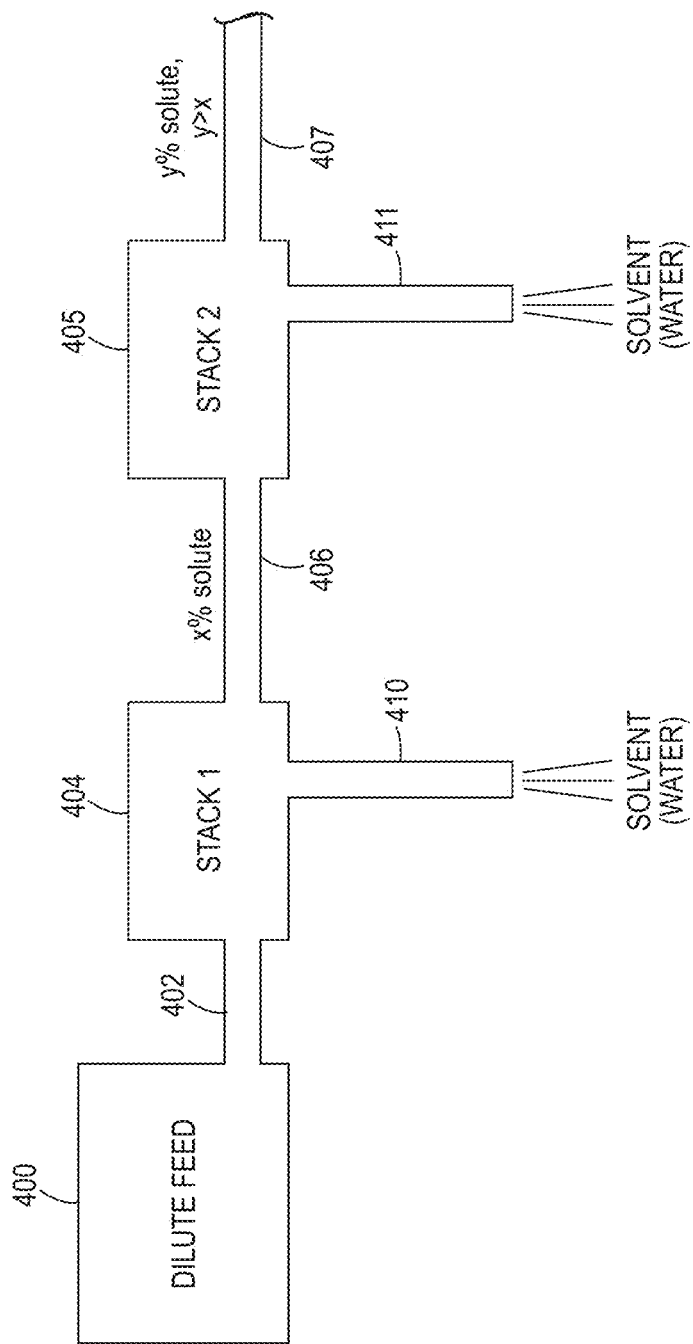

In FIG. 3, a diagram shows a series stack arrangement according to an example embodiment. A dilute feed reservoir 400 provides a feed stream 402 to a first electrochemical stack 404, which is connected in series to a second electrochemical stack 405. If the stacks 404, 405 are configured as shown in FIG. 1, they may each have their own dedicated salt regeneration device (see device 124) or may share a single salt regeneration device. Concentrate stream 406 of the first stack 404 is fed as a feed stream to second stack 405, which outputs its own concentrate stream 407, which has a higher concentration of solute than the concentrate stream 406. Solvent streams 410, 411 are discharged, however may also be held in a reservoir, holding tank, etc., for use of downstream processing. If the stacks 404, 405 are configured as shown in FIG. 1, they may each have their own dedicated salt regeneration device (see device 124) or may share a single salt regeneration device. The system shown in FIG. 4 may utilize other inputs, including electricity to drive the electrochemical reactions in the stacks 404, 405 and to drive fluid pumps (not shown) as known in the art. Note that the parallel and series arrangements shown in FIGS. 3 and 4 may be combined.

Figure 5:
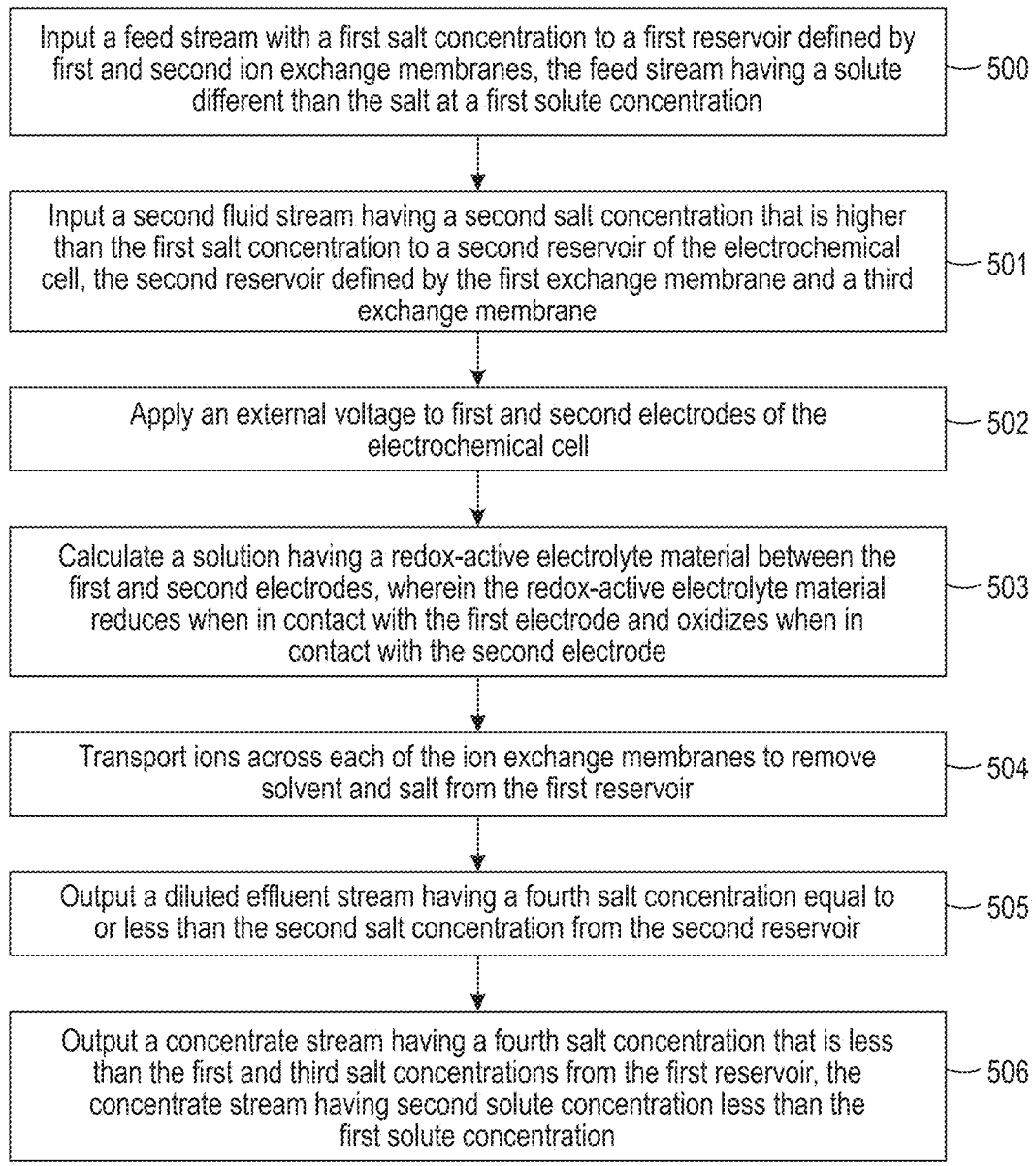
FIG. 5 is a flow diagram of a method in accordance with certain embodiments.

In FIG. 5, a flowchart shows a method for separating a solvent from a feed steam according to an example embodiment. The method involves inputting 500 a feed stream having a first salt concentration to a first reservoir defined by a first ion exchange membrane and a second ion exchange membrane of an electrochemical cell. The second ion exchange membrane is a different type of membrane from the first ion exchange membrane. A second fluid stream having a second salt concentration that is higher than the first salt concentration is input 501 to a second reservoir of the electrochemical cell. The second reservoir is defined by the first ion exchange membrane and a third ion exchange membrane. The third ion exchange membrane and the second ion exchange membrane are of the same type (e.g., AE or CE).

An external voltage is applied 502 to first and second electrodes of the electrochemical cell and a solution having a redox-active electrolyte material is circulated 503 between the first and second electrodes. The redox-active electrolyte material reduces when in contact with the first electrode and oxidizes when in contact with the second electrode. In response to the reduction and oxidation of the redox-active electrolyte material, ions are transported across the first, second, and third ion exchange membranes to remove solvent and salt from the first reservoir. An effluent stream having a third salt concentration equal to or less than the second salt concentration is output 505 from the second reservoir. A concentrate stream having a fourth salt concentration that is less than the first and third salt concentrations is output 506 from the first reservoir.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

The foregoing description has been presented for the purposes of illustration and description. It is not intended to be exhaustive or to limit the embodiments to the precise form disclosed. Many modifications and variations are possible in light of the above teachings. Any or all features of the disclosed embodiments can be applied individually or in any combination and are not meant to be limiting, but purely illustrative. It is intended that the scope of the invention be limited not with this detailed description, but rather, determined by the claims appended hereto.

What is claimed is:

1. An electrochemical system, comprising:
   a first reservoir receiving a feed stream, wherein the feed stream comprises a solvent, a salt having a first salt concentration in the feed stream, and a solute different than the salt at a first solute concentration;
   a second reservoir receiving a brine stream, the brine stream having a second salt concentration higher than the first salt concentration;
   a first electrode contacting a first solution of a first redox-active electrolyte material and configured to have a first reversible redox reaction with the first redox-active electrolyte material, and accept a first ion from the salt in the first reservoir;
   a second electrode contacting a second solution of a second redox-active electrolyte material and configured to have a second reversible redox reaction with the second redox-active electrolyte material, and drive a second ion into the brine stream in the second reservoir;
   an energy source configured to supply electrical potential to the first and second electrodes;
   a first membrane having a first ion exchange type disposed between the first and second reservoirs;
   a second membrane having a second ion exchange type, different from the first ion exchange type, disposed between the first electrode and the first reservoir;
   a third membrane having the second ion exchange type disposed between the second electrode and the second reservoir;
   an effluent stream comprising the solvent and a third salt concentration output from the second reservoir, wherein the solvent is removed from the first reservoir via electroosmosis and forward osmosis; and
   a concentrate stream output from the first reservoir, the concentrate stream comprising a fourth salt concentration that is less than the first, second, and third salt concentrations, and a second solute concentration greater than the first solute concentration.

2. The system of claim 1, wherein the electroosmosis involves salt ions dragging molecules of the solvent out of the first reservoir through the first and second membranes.

3. The system of claim 1, wherein the forward osmosis is due to the brine stream in the second reservoir having a higher osmotic pressure than the feed stream in the first reservoir.

4. The system of claim 1, wherein the fourth salt concentration is less than 0.05% by weight.

5. The system of claim 1, wherein the solute comprises sugar.

6. The system of claim 1, wherein the solvent is water.

7. The system of claim 1, wherein the first solution and the second solution are the same and the first and second solutions are circulated between the first electrode and the second electrode when a charge is applied to the electrodes.

8. The system of claim 1, wherein the first reservoir, the second reservoir, a membrane of the first type, and a membrane of the second type form a cell, and the system comprises a plurality of cells coupled together between the first and second electrodes.

9. The system of claim 1, wherein a portion of the brine stream is fed to the first reservoir.

10. The system of claim 1, further comprising a liquid concentrator coupled to the effluent stream and configured to regenerate the brine stream and produce a waste stream comprising the solvent.

11. The system of claim 10, wherein the liquid concentrator is an electrochemical liquid regenerator utilizing a redox shuttle.

12. The system of claim 1, wherein the first membrane and the second membrane have a first set of electroosmotic and osmotic transport properties and the third membrane has a second set of electroosmotic and osmotic transport properties that are different from the first set of properties, the system further comprising:
   a third reservoir defined by the second membrane and a fourth membrane having the first ion exchange type and the second set of electroosmotic and osmotic transport properties, wherein a second portion of the brine stream is input to the third reservoir;
   a fourth reservoir defined by the fourth membrane and a fifth membrane having the second ion exchange type and the second set of electroosmotic and osmotic transport properties, wherein a third portion of the brine stream is input to the fourth reservoir;
   a second effluent stream comprising the solvent and a fifth salt concentration output from the third reservoir, wherein the solvent is moved from the first and fourth reservoirs to the third reservoir via electroosmosis and forward osmosis; and a solvent stream comprising a sixth salt concentration output from the fourth reservoir.

13. The system of claim 12, wherein the effluent stream and the second effluent stream are combined and recirculated as the brine stream input to the second, third, and fourth reservoirs.

14. The system of claim 12, wherein the first, second, third and fourth reservoirs and the first, second, third, and fourth membranes form a regeneration cell, and the system comprises a plurality of regeneration cells coupled together by the fourth membrane of a first regeneration cell and the third membrane of a second regeneration cell defining the fourth reservoir of the first regeneration cell.

* * * * *